United States Patent [19]
Hauser et al.

[11] Patent Number: 6,145,745
[45] Date of Patent: Nov. 14, 2000

[54] METHOD AND APPARATUS FOR THE READING OF A BAR CODE

[75] Inventors: Peter Hauser, Freiburg; Jürgen Reichenbach, Emmendingen; Hubert Uhl, Waldkirch, all of Germany

[73] Assignee: Sick AG, Waldkirch, Germany

[21] Appl. No.: 09/064,022

[22] Filed: Apr. 21, 1998

[30]    Foreign Application Priority Data

Apr. 22, 1997 [DE]   Germany .......................... 197 16 886

[51] Int. Cl.⁷ .................................................. C06K 7/10
[52] U.S. Cl. ................................ 235/462.07; 235/462.25
[58] Field of Search .......................... 235/462.07, 462.1, 235/462.11, 462.12, 462.16, 462.18, 462.19, 462.25

[56]    References Cited

U.S. PATENT DOCUMENTS

| | | | |
|---|---|---|---|
| 4,308,455 | 12/1981 | Bullis et al. | 235/463 |
| 4,409,469 | 10/1983 | Yasuda et al. | 235/463 |
| 4,866,893 | 9/1989 | McGinnis | 52/108 |
| 5,028,772 | 7/1991 | Lapinski et al. | 235/467 |
| 5,045,677 | 9/1991 | Okamura | 235/462 |
| 5,124,538 | 6/1992 | Lapinski et al. | 235/467 |
| 5,155,343 | 10/1992 | Chandler et al. | 235/462 |
| 5,155,344 | 10/1992 | Fardeau et al. | 235/462 |
| 5,245,167 | 9/1993 | Takenaka | 235/462 |
| 5,262,625 | 11/1993 | Tom et al. | 235/462 |
| 5,296,691 | 3/1994 | Waldron . | |
| 5,304,787 | 4/1994 | Wang | 235/462 |
| 5,319,181 | 6/1994 | Shellhammer et al. | 235/462 |
| 5,387,787 | 2/1995 | Waldron et al. | 235/462 |
| 5,422,470 | 6/1995 | Kubo | 235/462 |
| 5,428,211 | 6/1995 | Zheng . | |
| 5,478,999 | 12/1995 | Figarella et al. | 235/462 |
| 5,550,365 | 8/1996 | Klancnik et al. | 235/462 |
| 5,912,452 | 6/1999 | Wiklof et al. | 235/472.01 |

FOREIGN PATENT DOCUMENTS 195 34 009
A1   3/1997   Germany .

*Primary Examiner*—Thien M. Le
*Attorney, Agent, or Firm*—Townsend and Townsend and Crew LLP

[57]    ABSTRACT

A method is described for the reading of a bar code consisting of a predetermined number of code elements for the production of a binary signal with sequential high and low phases the length of which correspond to the width of the sequential code elements. In the method the code elements are scanned by the scanning beam or by a plurality of scanning beams of a bar code reader along scanning lines extending substantial parallel to one another. During this the sweeping of the scanning beam over the bar code defines a scan and a scanning plane is defined by each scanning beam when sweeping over the bar code. The angle of tilt between the respective scanning plane and A predetermined reference plane is determined for essentially each scan. During the decoding of the bar code the angles of tilt thus found are evaluated to compensate for grid errors, i.e. for irregular spacings between adjacent scanning lines. Furthermore, a method for the compensation of fluctuations in the scanning speed and also an apparatus for carrying out the method are described.

38 Claims, 5 Drawing Sheets

METHOD AND APPARATUS FOR THE READING OF A BAR CODE

FIELD OF THE INVENTION

The present invention relates to a method of reading a bar code comprising a predetermined number of code elements for the generation of a binary signal with sequential high-low phases, the lengths of which correspond to the widths of the sequential code elements, in particular with a reading direction extending obliquely to the code elements. Furthermore, the invention is directed to an apparatus for carrying out this method.

DESCRIPTION OF THE PRIOR ART

Different methods of decoding the bar code are known depending on whether the scanning beam of a bar code reader that is used sweeps over the code elements of the bar code obliquely or in the longitudinal direction of the bar code. In this respect, the scanning beam normally multiply sweeps over the bar code in order to increase the detection accuracy. If a relative movement exists during this between the bar code and the scanning beam, for example if the bar code is moved past the bar code reader, then a plurality of scanning lines are projected onto the bar code, whereas with a lack of relative movement the scanning beam is moved multiply along the same scanning line over the bar code. Both the bars and also the gaps of the bar code between the bars are generally termed code elements.

As a result of irregularities in the bar code reader transmitting the scanning beams the following problems can arise during the scanning and decoding of the bar code:

if the scanning beam is guided over the bar code by a mirror wheel provided inside the bar code reader then a grid error of the scanning beams can arise through the tolerances present in the deflection unit of the bar code reader, i.e. the scanning planes defined by the scanning beams when sweeping over the bar code do not exactly coincide from scan to scan but are rather tilted at different angles of tilt relative to one another. With a relative movement between the bar code and the bar code reader the scanning lines projected onto the bar code are not equidistant but are rather distributed at irregular spacings from one another.

Through this scanning error (also known in the following as grid errors) an image distortion arises which makes the recognition of a bar code, or the decoding, difficult or indeed impossible.

As a result of fluctuations in the speed of rotation of the deflection unit, which can, for example, be caused by an irregular running of yhe motor for the mirror wheel, different scanning speeds can arise from scan to scan, and also within a scan, which likewise cause image distortions of the detected bar code.

Further image distortions can arise through undesired mirror characteristics of the mirror wheel or through other random effects. For example, the mirrors that are used can have focusing or defocusing characteristics which cause an irregular scan of the bar code.

OBJECT OF THE INVENTION

The present invention is thus based on the object of so designing a method and an apparatus of the initially named kind that a decoding of a scanned bar code is possible despite the described image distortions.

SUMMARY OF THE INVENTION

This object is satisfied, starting from the method of the initially named kind, wherein the code elements are scanned by a scanning beam or by a plurality of scanning beams of a bar code reader along scanning lines extending substantially parallel to one another, wherein, the sweeping of a scanning beam over the bar code defines a scan and each scanning beam defines a scanning plane on sweeping over the bar code, wherein for substantially each scan the angle of tilt between the respective scanning plane and a predetermined reference plane is determined, and in that on the decoding of the bar code the angle of tilt that has been found is evaluated for the compensation of grid errors, i.e. of non-uniform intervals between angles of tilt scanning lines.

As the angles of tilt of the scanning planes represent a representative value for the grid error, the image distortions which arise as a result of the grid error can be compensated by corresponding evaluation of the angle of tilt, so that a decoding of the bar code that has been detected is possible.

In accordance with a preferred embodiment of the invention, each region of a code element scanned by a scanning line forms a code element section and in each case a reference code element is found from mutually associated code element sections found for different scanning lines and each representing the same code element of the bar code, and the shift of the code element sections in the scanning direction, as a result of the angle of tilt found for a scanning plane associated with a scanning line, is in each case taken into account in forming the reference code elements.

During the scanning, the code elements are split up into individual regions, which will be termed code element sections in the following, during the scanning by the scanning beams which sweep over the code elements. Through the method of the invention, a two-dimensional image of the bar code is produced which is tilted relative to the scanning direction by the tilt angle (angle between the scanning direction and a perpendicular to the bar orientation of the bar code) and from this image mutually associated code element sections resulting for different scanning lines and each representing the same code element of the scanned bar code are extracted from which a reference code element is formed. Since the mutually associated code element sections are shifted relative to one another as a result of the grid error, the respective shift is determined in accordance with the invention from the angles of tilt found from the scanning planes and is taken into account in forming the reference code elements. In this manner, the image distortion caused by the grid errors can be compensated.

The scanning lines which extend substantially in parallel over the bar code are produced by a relative movement between the scanning beam and the article carrying the bar code. In this respect, either the article can be guided substantially perpendicular to the scanning direction, or the scanning beam can, for example, be moved to and fro transverse to the scanning direction by by oscillating movement of a deflection unit. Basically, it is also conceivable for the bar code reader to simultaneously scan the bar code with a plurality of scanning lines extending substantially parallel to one another, so that a separate scanning beam is associated with each scanning line or in each case with some of the scanning lines. Any desired combinations of these described methods are also conceivable.

With regard to the evaluation of the code element sections and the formation of the reference code elements, and also the decoding of the reference bar code produced thereby, reference is made to the patent application filed on Mar. 21, 1997 entitled "Method and apparatus for the reading of a bar code" of the same applicants.

In accordance with a further advantageous embodiment of the invention, a predetermined learning bar code, i.e. a predetermined grid pattern is multiply scanned in a learning phase, in a scanning direction extending obliquely to the code elements, the angles of tilt of the different scanning planes are stored and the stored angles of tilt are used in operation during the decoding of the bar code for the compensation of the grid errors.

Since the grid errors can have systematic component, which can, for example, be caused by a not fully exact adjustment of the mirror wheel, or of the individual mirrors of the mirror wheel, it is possible to learn this systematic part of the grid error before taking the bar code reader into operational use, by detecting and storing the angles of tilt of the different scanning planes which occur. The stored angles of tilt can then be used in the operation of the bar code reader for the compensation of the grid errors.

In accordance with a further preferred embodiment of the invention, the distances between different and, in particular, neighboring scanning lines are found, in particular by a sensor element, with the angle of tilt in each case being determined from the distances that are found and also from the scanning distance between the bar code reader transmitting the scanning beams and the bar code. In this manner, an on-line recognition of the grid errors is possible in operation, so that the random components of the grid error can be determined and compensated in addition to the systematic components. The sensitivity of the method can be further increased by a beam folding in the bar code reader.

A further solution of the underlying object is achieved, starting from a method of the initially-named kind wherein the code elements are scanned by one or more scanning beams of a bar code reader along a scanning line, or along a plurality of scanning lines extending substantially parallel to one another, wherein each time a scanning beam sweeps over a bar code a scan is defined; wherein for the detected code elements the position within the scanning line and the width in the scanning direction is in each case normalized and wherein the normalized positions and widths of the detected code elements are used for the decoding of the bar code.

Through this method of the invention, image distortions which are caused by fluctuations in the speed of rotation of the deflection unit, by mirror characteristics of the mirror wheel, or by other random effects can, in particular, be compensated.

Through these image distortions irregularities arise both in the position and also in the width determination of the code elements of the bar code, so that, for example, for two sequential scans of the bar code with different speeds, different positions for one and the same code element can be found within the scanning lines and different element widths can be found in the scanning direction. These irregularities can be compensated by a normalizing of the positions and widths of the code elements, so that a decoding of this bar code is possible without problem using the normalized positions and widths.

In accordance with a further advantageous embodiment of the invention the actual duration of the actual scan and the actual positions and widths of the detected code elements are determined in each case, with the normalized position or the detected code elements being found in accordance with the formula $$P_{norm} = P_{akt} * T_{nom}/T_{akt}$$

and a predetermined nominal duration of the scan is used for $T_{nom}$.

Through this variant of the method of the invention, low frequency fluctuations in the speed of rotation of the deflection unit can be compensated which have a frequency substantially lower than the scanning frequency. Starting from an assumed constant uniform running during a scan the normalized width of the code elements can be determined in accordance with the formula quoted and used for the decoding of the bar code.

The normalized width of a detected code element is preferably found by the formula $$B_{norm}(n-1) = P_{norm}(n) - P_{norm}(n-1)$$

with $P_{norm}(n)$ representing the normalized position of the detected code element and $P_{norm}(n-1)$ the normalized position of the code element following it.

In accordance with a further advantageous embodiment of the invention, the scanning beam is additionally guided during a scan, in particular via a beam divider, for example a semipermeable mirror, along a reference scanning line over a reference grid, the actual positions of a detected code element and also of the m−1th and of the mth element of the reference grid are determined, with the element of the reference grid scanned directly prior to the detection of the code element being used as the m31 1th element and the subsequent element of the reference grid being used as the mth element, the normalized position of a detected code element is determined in accordance with the formula $$P_{norm} = (m-2) * B_{ref/nom} + B_{ref/nom} * \frac{P_{akt} - P_{ref/akt}(m-1)}{P_{ref/akt}(m) - P_{ref/akt}(m-1)}$$

a predetermined nominal width of the elements of the reference gird is used for $B_{ref/nom}$.

Using this method, fluctuations in the speed of rotation of a deflection unit can, in particular, be compensated of which the frequency is higher than the scanning frequency, so that notable fluctuations of the speed of scanning arise within a scan. Inasmuch as a part of the energy of the scanning beam is coupled out via a beam divider and simultaneously guided to the channel being used via a precise predetermined reference grid a comparison is possible between the bar code that is detected and the reference grid that is detected, whereby the normalized positions and widths of the code elements of the bar code can be determined, which are almost independent of the speed of the rotation.

Instead of the division of the scanning beam and guidance via a reference channel, a normalization of this kind can also be produced by the use of an incremental angle transducer on the mirror wheel.

The normalized width of a detected code element can in turn be advantageously found from the formula $$B_{norm}(n-1) = P_{norm}(n) - P_{(norm)}(n-1).$$

In accordance with a further preferred embodiment of the invention, each region of a code element scanned by a scanning line forms a code element section, with the normalized positions and widths of the code elements being determined, and with a reference code element in each case being found from mutually associated code element sections found for different scanning lines and each representing the same code element of the bar code, by taking account of their normalized positions and widths. Through the use of the normalized positions and widths of the individual code element sections the image distortions caused by fluctuations in the speed of rotation are eliminated, so that an unambiguous formation and decoding of the reference code elements can take place.

BRIEF DESCRIPTION OF THE DRAWINGS

FIGS. 4a–c are a schematic representation of the process of generating a reference code element, FIGS. 5a–c are a representation in accordance with FIGS. 4a–c in which the scanning lines have a considerably grid error.

DESCRIPTION OF THE PREFERRED EXEMPLARY EMBODIMENTS

Figure 1:
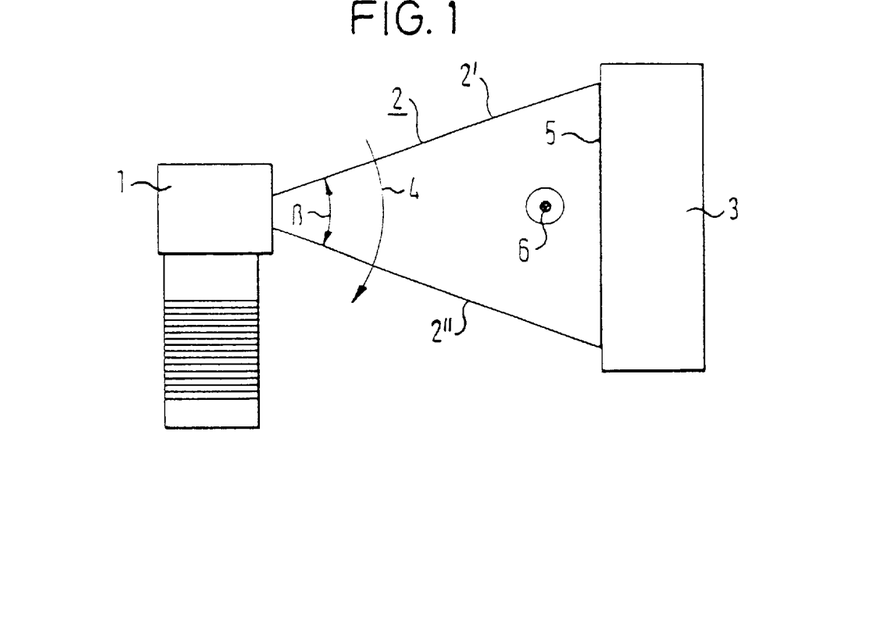
FIG. 1 is a schematic representation of a bar code reader and also of an article scanned by a scanning beam of the bar code reader.

FIG. 1 shows a bar code reader 1 which transmits a scanning beam 2 in the direction towards an article 3 on the surface of which there is arranged a bar code to be scanned. As is indicated by an arrow 4 the scanning beam 2 executes a pivotal movement through an angle β so that it moves to and fro between the positions designated with the reference numerals 2' and 2" in FIG. 1. The pivoting of the scanning beam 2 can, for example, take place through a rotating mirror wheel arranged in the bar code reader 1.

By the pivoting of the scanning beam 2 through the angle β the surface of the object 3 is thus scanned along a scanning line 5.

In order for the scanning beam 2 to be able to sweep over a surface of the article 3, the article 3 is, for example, moved perpendicular to the plane of pivoting of the scanning beam 2 in accordance with the arrow 6 projecting out of the surface of the drawing. The arrow 6 thus shows the conveying direction of the object 3. It is, however, basically also possible to allow the scanning beam 2 to execute a pivotal movement parallel to the arrow 6 in addition to the described pivotal movement, so that an areal scanning of a region of the surface of the object 3 takes place, even if the object 3 does not move.

Furthermore, it is fundamentally possible for the bar code reader 1 to transmit a plurality of scanning beams 2 which are, for example, pivoted synchronously within scanning planes which extend parallel to one another in the ideal case.

Figure 2:
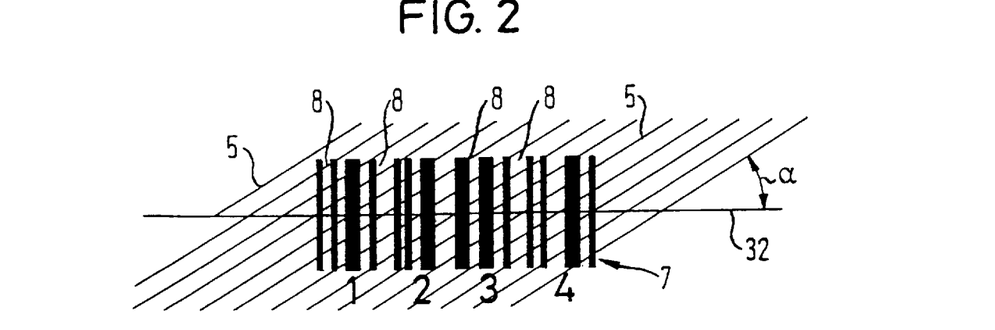
FIG. 2 is a bar code with scanning lines which have a small grid error or no grid error.

FIG. 2 shows a bar code 7 which includes a plurality of code elements 8 consisting of bars and gaps, onto which a plurality of scanning lines 5 are projected along which the bar code 7 is scanned by scanning beams.

The scanning lines 5 extend obliquely to the longitudinal axis 32 of the bar code 7 and include with this longitudinal axis the so-called tilt angle α. Furthermore, the scanning lines 5 extend substantially parallel to one another and have equidistant spacings from one another.

The arrangement of the scanning lines in accordance with FIG. 1 results when the deflection unit of the code reader is so precisely adjusted that the scanning planes defined by the scanning beams 2 coincide in a single scanning plane, so that, with a uniform relative movement between the bar code 7 and the bar code reader 1, the equidistant arrangement of the scanning lines 5 shown in FIG. 2 is obtained.

Figure 3:
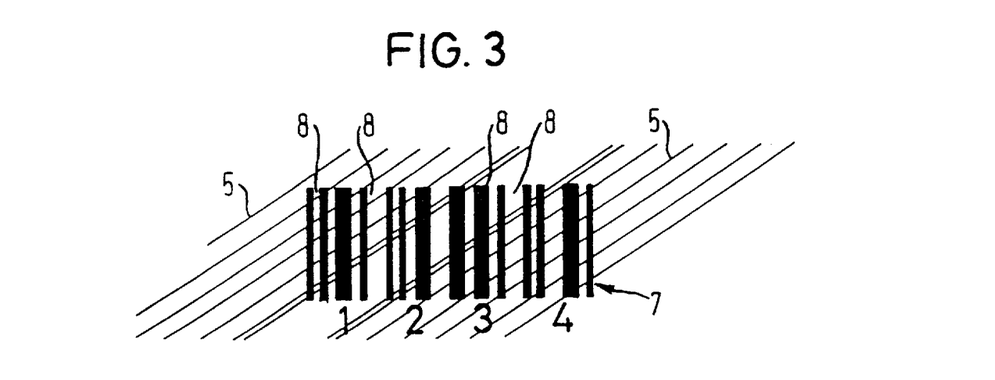
FIG. 3 is a bar code with scanning lines which have a considerably grid error.

In practice, as a result of unavoidable tolerances in the deflection unit, the arrangement of the scanning lines shown in FIG. 3 with a considerable grid error can arise instead of the ideal situation shown in FIG. 2, i.e. the scanning lines 5 are arranged at different spacings from one another.

Figure 4:
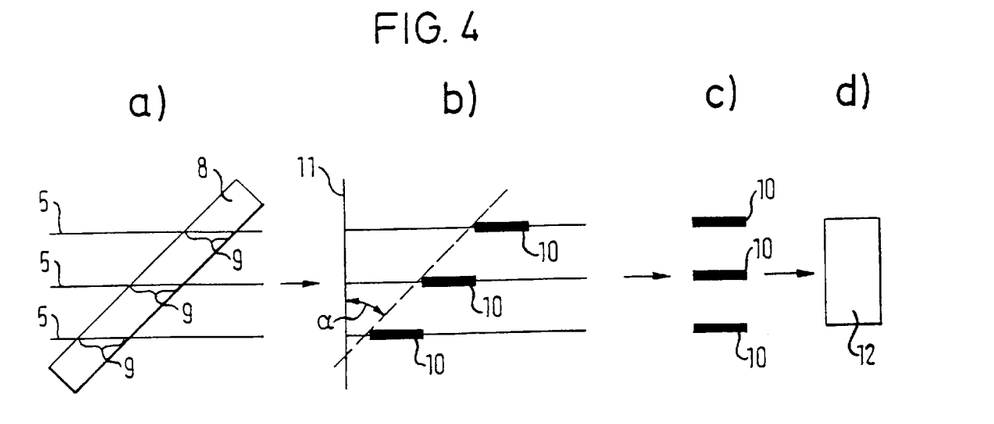
Figure 5:
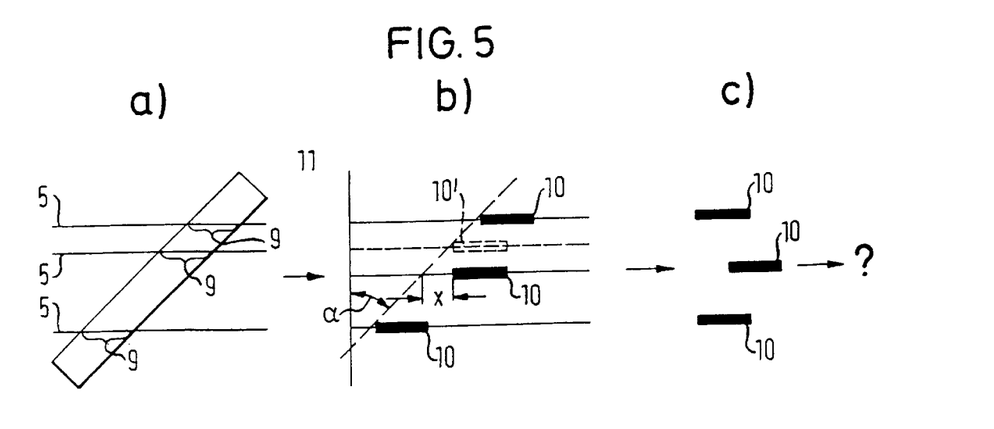

Through this grid error an image distortion is produced during the scanning of the bar code as will be described in the following with reference to FIGS. 4 and 5.

In FIG. 4a, a bar code 8 is shown which is scanned along three scanning lines 5 by a scanning beam. The regions 9 of the code element 8 scanned along the scanning lines 5 are stored as code element sections 10 in an image memory, which is schematically illustrated in FIG. 4b. Because the scanning lines 5 extend obliquely to the code element 8, the code element sections 10 are displaced relative to one another with respect to a straight reference line 11, which stands perpendicular to the scanning direction.

The correction of the distortion of the code element sections 10 stored in the image memory is effected by determination of the tilt angle α so that the association of code element sections 10 illustrated in FIG. 4c is possible and the reference code element 12 is produced from this in accordance with FIG. 4d.

In FIG. 5a, the scanning lines 5 have irregular spacings, with the upper two scanning lines 5 being arranged substantially closer together than the lower two scanning lines 5.

With this considerable grid error, the code elements 10 are stored in the image memory in accordance with FIG. 5b. From this, it is evident that the central code element section 10 has a shift x relative to the lower code element 10 in comparison to FIG. 4b which arises as a result of the grid error of the scanning lines 5. The position of the central code element section 10 in the scanning direction thereby corresponds to the position of the code element section 10' shown in broken lines as would be stored in the image memory if the grid error of the scanning lines were known and could be taken into account. Since this grid error is not known, it is assumed that there is an equidistant arrangement of the scanning lines 5 when stored in the code element sections 10 in the image memory, so that the distorted image shown in FIG. 5b is stored in the image memory. On taking account of the shift of the code element sections 10 which is caused by the tilt angle α the arrangement of the code element sections 10 shown in FIG. 5c arises. No reliable recognition of a code element is possible from this arrangement, so that no reference code element can be produced.

Figure 6:
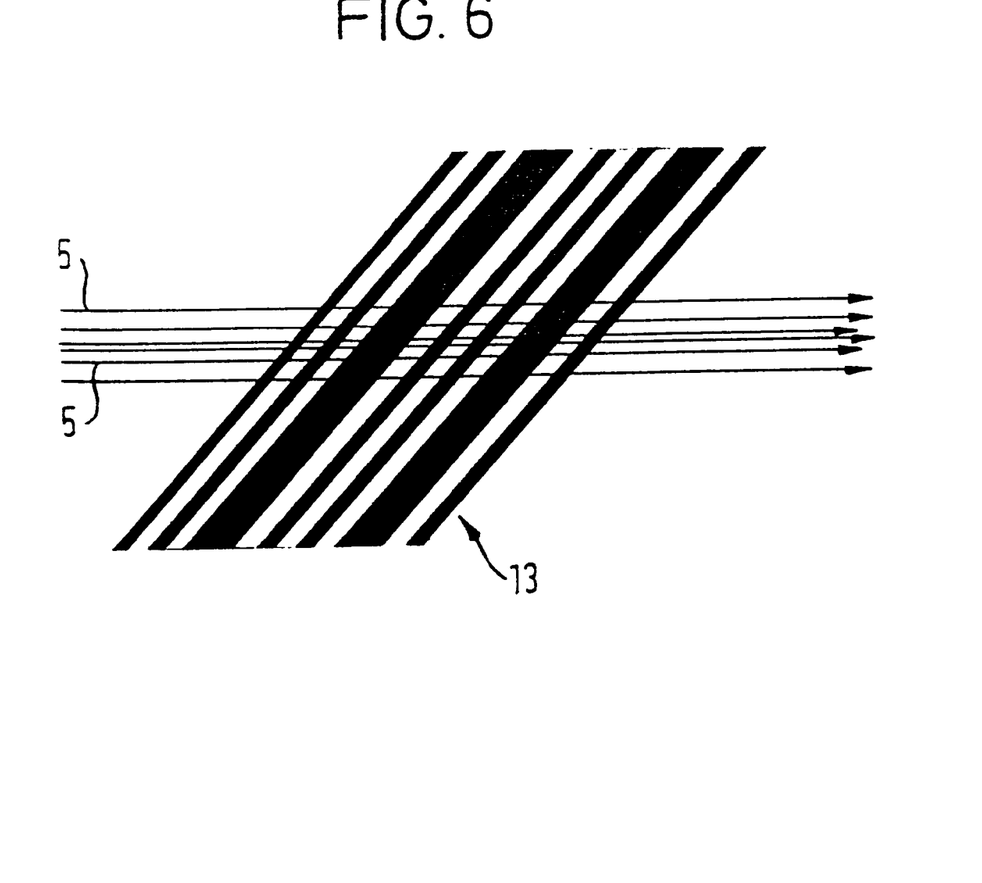
FIG. 6 is a further bar code with scanning lines.

If the grid error which leads to the offset or shift x in accordance with FIG. 5b is of a systematic nature then it can be learned prior to taking the bar code reader into operation. For this purpose, an obliquely placed coding 13 (FIG. 6) or a black-white grid is scanned from the largest possible distance by the bar code reader for which the systematic grid error is to be learned. From this, the scanning lines 5 shown in FIG. 6 result which have different spacings relative to one another in accordance with the systematic grid error.

The scanned element sections are stored in an image memory in accordance with FIG. 5b which results in the shift of the individual elements relative to one another shown in FIG. 5b.

Taking account of the tilt angle known during the learning process, and also of the scanning distance, the offset x and thus the angle of tilt of the scanning plane which causes the grid error can be calculated and stored for each scan.

In operation the respective offset x of a code element section 10 can then be calculated for each scan from the stored angle of tilt and also from the tilt angle to be found and from the scanning distance and can be taken into account in forming the reference code element 12 and in the decoding.

Figure 7:
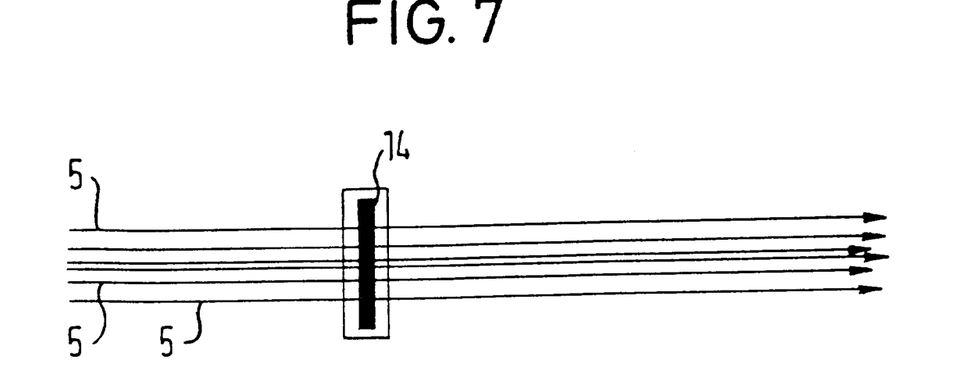
FIG. 7 is a schematically illustrated line sensor for determination of the grid error of the scanning lines.

If random components are also present in addition to or instead of the systematic components of the grid error, then a row sensor 14 can be built into the bar code reader perpendicular to the scanning direction, as is schematically shown in FIG. 7. By means of the row sensor an on-line recognition of both the systematic grid error and also of the random grid error is possible, because the spacing between two neighboring scanning lines 5, and thus the angle of tilt can be determined directly from the spacing, from which the offset x of the code element sections can in turn be derived.

Figure 8:
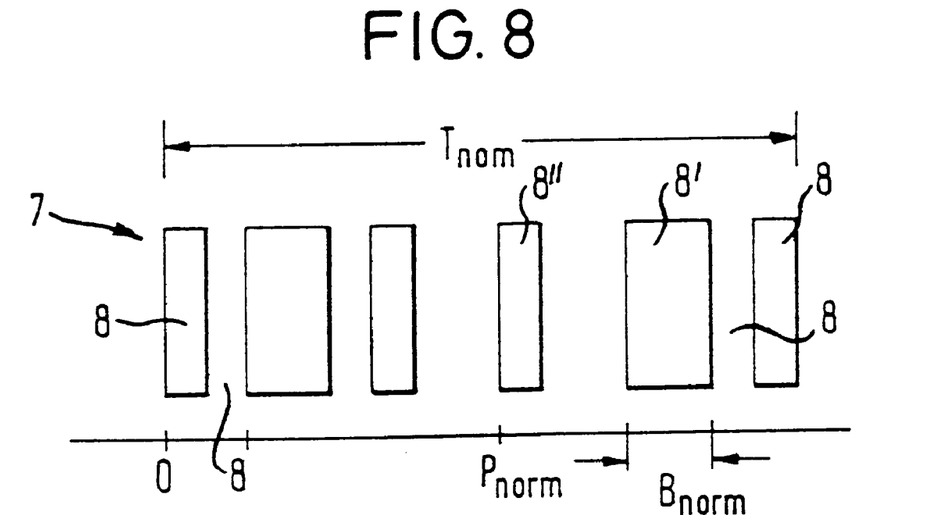
FIG. 8 is a detected bar code which was scanned within a scanning duration of $T_{nom}$.

FIG. 8 shows code elements 8 of a bar code 7 which have been scanned and detected in a scan with the nominal scanning duration $T_{nom}$. In this respect, the width of the penultimate code element 8' is designated with $B_{norm}$ and the position of the third from last code element 8" is designated with $P_{norm}$.

Figure 9:
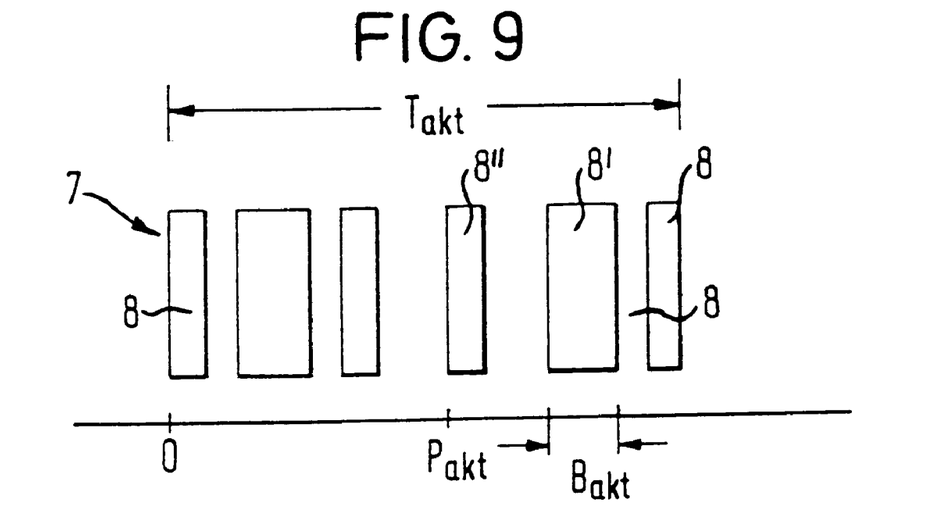
FIG. 9 is a bar code of FIG. 8 during a scan within the scanning duration $T_{akt} \neq T_{nom}$.

FIG. 9 shows the same bar code 7 which was scanned and detected with a higher scanning speed in comparison with FIG. 8, and thus within a time $T_{akt}<T_{nom}$. One recognizes that the width $B_{akt}$ found for the code element 8' is smaller than the width $B_{norm}$ of the code element 8' of FIG. 8 and the position $P_{akt}$ of the code element 8" differs from the position $P_{norm}$ of the code element 8" in FIG. 8.

In order to compensate for the dependencies on the scanning speed, such as are produced by fluctuations in the speed of rotation of the deflection unit of the bar code reader, the actual positions $P_{akt}$ that are found and the actual widths $B_{akt}$ that are found for the code elements 8 can be normalized to the values shown in FIG. 8 in accordance with the formulae $$P_{norm}=P_{akt} * T_{nom}/T_{akt}\ B_{norm}\ (n-1)=P_{norm}\ (n)-P_{norm}\ (n-1).$$

In this respect, two sequential code elements are specified by the parameters n and n−1 and any desired preset duration is used for the nominal scanning duration $T_{nom}$.

Figure 10:
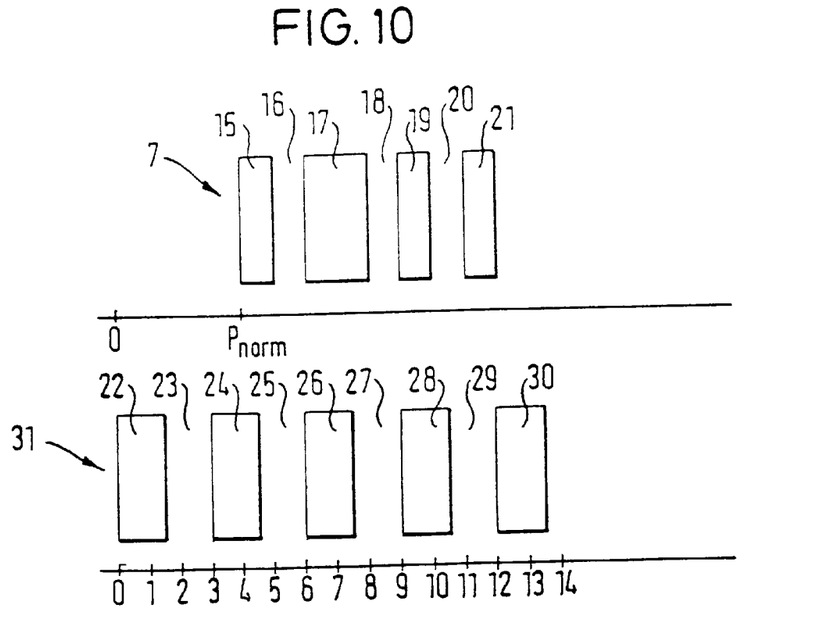
FIG. 10 is further bar code with a reference grid.

Thus, uniform normalized values are obtained for the code element widths and positions within different scans, independently of the actual scanning speed, and thus independently of fluctuations in the speed of rotation of the deflection unit of the bar code reader. In this manner, a correction of the distortion of the detected bar code is achieved and thus the decoding of the detected bar code is simplified. FIG. 10 shows a bar code 7 which consists of code elements 15 to 21. A reference grid 31 consisting of elements 22 to 20 is shown beneath the bard code 7, with the elements 22 to 30 each having the same width.

If higher frequency fluctuations in the speed of rotation of a deflection unit arise during the scanning of the bar code 7, and thus fluctuations of the scanning speed within one scan, then different values are obtained for the widths and positions of the code elements 15 to 21 within a scan, depending on the actual scanning speed. The image distortions which thereby arise can not be compensated by the method described in FIGS. 8 and 9, since only low frequency scanning fluctuations can be compensated by this method which do not have any effect within one scan.

Higher frequency fluctuations in the speed of rotation of the deflection unit are compensated in accordance with the invention wherein a scanning of the reference grid 31 takes place simultaneously with the scanning of the bar code 7. For this purpose, a part of the energy of the scanning beam is coupled out, for example, via a semipermeable mirror and led over the reference grid 31 simultaneously to the operational components sweeping over the bar code 7.

Figure 11:
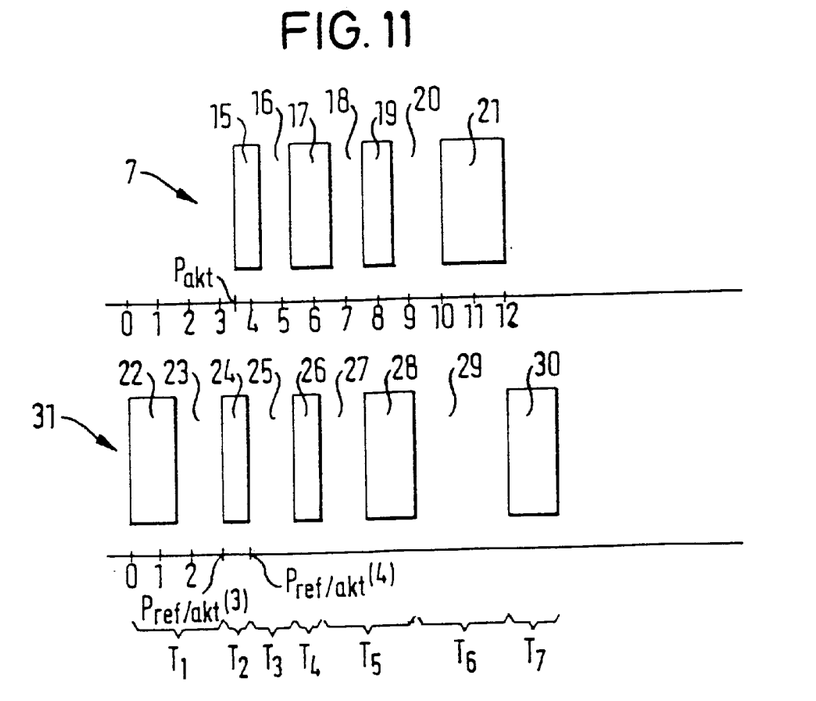
FIG. 11 is the bar code and the reference grid of FIG. 10 with non-uniform speed of scanning.

In accordance with the formula $$P_{norm} = (m-2)*B_{ref/nom} + B_{ref/nom} * \frac{P_{akt} - P_{ref/akt}(m-1)}{P_{ref/akt}(m) - P_{ref/akt}(m-1)}$$

a normalized position independent of the speed of scanning can be calculated for each of the scanned code elements 15 to 21, independently of the respectively found actual position of the code element, which is dependent on the speed of scanning. Furthermore, the normalized element width of the code element lying between two sequential normalized positions can be determined from the difference between these two positions. This will be explained in more detail with reference to an example and to FIG. 11. In this connection, the position of the first edge of the respective elements swept over during scanning, i.e. the start of the element as seen in the scanning direction, is in each case used as the position of a code element or an element of the reference grid. The second edge of the respective element, i.e. the end of the element in the scanning direction, the center between the start and the end, or another parameter which uniquely defines the position of the respective element can also be used for the referencing of the position. The above quoted formula must then if necessary be adapted to the reference point that is used.

FIG. 11 shows the bar code 7 and the reference grid 31 of FIG. 10 as detected during a scan with fluctuating scanning speed.

Whereas the scanning beam was guided within a time interval $T_1$ with the nominal speed, so that the elements 22 and 23 of the reference grid 31 swept over in this time interval have the normalized width and also the normalized positions shown in FIG. 10, the scanning beam was guided during the time interval $T_2$ with an increased speed over the bar code 7 and the reference grid 31. From this, the reduced widths of the code element 15 and of the element 24 as shown in FIG. 11 result relative to the normalized width of the corresponding elements in FIG. 10.

During the time interval $T_3$ the scanning beam was again guided with the nominal speed of movement over the bar code 7 and over the reference grid 31, whereas it was guided during the time interval $T_4$ with a higher speed over the bar code 7 and the reference grid 31. After the scanning beam was again moved with the nominal speed in the time interval $T_5$, it was guided in the time interval $T_6$ at the reduced speed over the bar code and the reference grid 31 and subsequently moved with the nominal speed again during the time interval $T_7$.

Through these differing speeds of the scanning beam, different actual widths and positions of the code elements 15 to 21 and of the elements 22 to 30 as shown in FIG. 11 result in comparison to the normalized positions and widths shown in FIG. 10.

If one, for example, considers the code element 16 then its normalized position $P_{norm}$, which is entered into FIG. 10 is determined in the following manner.

First of all, the actual position $P_{akt}$ of the code element 15 and also the actual positions $P_{ref/akt}(m-1)$ and $P_{ref/akt}(m)$ of the elements 24 and 25 of the reference grid 31 directly preceding and following the code element 15 are determined. In doing so, the following values result:

$P_{akt}$=3.5

$P_{ref/akt}$ (3)=3 (for m=4 since the element 25 is the fourth element of the reference 31)

$P_{ref/akt}$ (4)=3.75

Since in accordance with FIG. 10 the normalized width of the elements 22 to 30 of the reference grid 31 $B_{ref/norm}$=1.5 the normalized position $P_{norm}$ of the code element 15 results as $$P_{norm} = (4-2)*1.5 + 1.5*\frac{3.5-3}{3.75-3} = 4$$

This corresponds to the normalized position $P_{norm}$ of the code element 15 demonstrated in FIG. 10.

In the same manner, the normalized position of the code element 16 to four can be determined, so that the normalized width of the code element 15 is determined in accordance with the formula $$B_{norm}(n-1) = P_{norm}(n) - P_{norm}(n-1) = 4-3 = 1$$

In this manner, the normalized position and also the normalized width can be determined for each of the code elements 15 to 21 of the bar code 7 so that uniform values for the positions and widths of the code elements of the bar code can be found independently of the fluctuations in the speed of rotation of the deflection unit. Thus, the image distortions caused by fluctuations in the speed of rotation can be compensated and the decoding of the bar code can be reliably effected.

What is claimed is:

1. A method of reading a bar code comprising a predetermined number of code elements for the generation of a binary signal with sequential high-low phases, the lengths of which correspond to the widths of the sequential code elements, the method comprising:

scanning the code elements by at least one scanning beam of a bar code reader along scanning lines extending substantially parallel to one another, wherein the sweeping of a scanning beam over the bar code defines a scan and each scanning beam defines a scanning plane on sweeping over the bar code;

determining for substantially each scan, an angle of tilt between the respective scanning plane and a predetermined reference plane; and upon decoding of the bar code, evaluating the angle of tilt that has been found for compensation of grid errors.

2. A method in accordance with claim 1 wherein a reading direction extends obliquely to the code elements.

3. A method in accordance with claim 1 wherein the grid errors consist of non-uniform intervals between neighboring scanning lines.

4. A method in accordance with claim 1 wherein the scanning plane of a first scan is sued as a reference plane.

5. A method in accordance with claim 1 wherein each region of a code element sensed along a scanning line forms a code element section, and the method further comprises determining a reference code element in each case from mutually associated code element sections found for different scanning lines and each representing the same code element of the bar code, wherein in each case the shift of the code element sections in the scanning direction resulting from the angle of tilt determined for a scanning plane associated with the scanning line is found and taken into account in the formation of the reference code elements.

6. A method in accordance with claim 1 wherein one of a predetermined learning bar code or a predetermined grid pattern in a scanning direction extending obliquely to the code elements is multiply scanned in a learning phase and the angle of tilt of the different scanning planes are stored, and wherein the stored angles of tilt are used in operation during the decoding of the bar code for the compensation of the grid errors.

7. A method in accordance with claim 5 wherein the angles of tilt are respectively determined from the shift in the scanning direction of mutually associated code elements sections from a tilt angle between the scanning direction and the vertical to the bar orientation of the bar code and from the sensing distance between the bar code reader transmitting the scanning beams and the bar code.

8. A method in accordance with claim 7 wherein the mutually associated code element sections are adjacently disposed mutually associated code element sections.

9. A method in accordance with claim 8 wherein spacing between different scanning lines are found and angles of tilt are respectively determined from the distances that are found and also from the sensing distance between the bar code reader transmitting the scanning beams and the bar code.

10. A method in accordance with the claim 9 wherein the spacings between different scanning lines that are found are between neighboring scanning lines.

11. A method in accordance with claim 9 wherein the spacings between different scanning lines are found by a sensor element.

12. A method in accordance with claim 11 wherein the sensor element is a line sensor.

13. A method in accordance with claim 12 wherein the line sensor is arranged perpendicular to the scanning direction.

14. A method in accordance with claim 13 wherein the sensor element is one of a CCD line or a positioned sensitive detector.

15. A method in accordance with claim 11 wherein the detection of the spacing between the scanning lines takes place during the scanning operation for the comparison of both systematic and random errors.

16. A method in accordance with claim 1 further comprising carrying out a beam folding to increase sensitivity.

17. A method of reading a bar code consisting of a predetermined number of code elements for generation of a binary signal with sequential high-low phases, the length of which corresponds to the width of the sequential code elements, the method comprising:

scanning the code elements by at least one scanning beam of a bar code reader along at least one scanning line, wherein each time a scanning beam sweeps over a bar code a scan is defined;

normalizing, for the detected code elements, the position within the scanning line and the width in the scanning direction in each case; and using the normalized positions and widths of detected code elements for decoding of the bar code.

18. A method in accordance with claim 17 wherein the code elements are scanned along scanning lines extending substantially parallel to one another.

19. A method in accordance with claim 17 further comprising determining an actual duration of the actual scan in each case, determining the actual positions and the actual widths of the detected code elements in each case, and determining the normalized position of a detected code element in accordance with the formula $$P_{norm} = P_{akt} * T_{nom}/T_{akt}$$

with a predetermined nominal duration of scan being used for $T_{nom}$.

20. A method in accordance with claim 17 further comprising additionally guiding the scanning beam along a reference scanning line and over a reference grid simultaneously with the scanning of a bar code, determining the actual position of a detected code element, determining the actual positions of the small m−1th and the mth elements of the reference grid, wherein the element of the reference grid scanned immediately before the detection of the code element is used as the m−1th element and the subsequent element of the reference grid used as the mth element, and determining the normalized position of the detected code element in accordance with the formula $$P_{norm} = (m-2)*B_{ref/nom} + B_{ref/nom} * \frac{P_{akt} - P_{ref/akt}(m-1)}{P_{ref/akt}(m) - P_{ref/akt}(m-1)}$$

wherein a predetermined nominal width of the elements of the reference grid is used for $B_{ref/nom}$.

21. A method in accordance with claim 20 wherein the scanning beam is initially guided via a beam divider.

22. A method in accordance with claim 21 wherein the beam divider is a semipermeable mirror.

23. A method in accordance with claim 17 wherein the normalized position is found for substantially every detected code element of the bar code.

24. A method in accordance with claim 17 further comprising finding the normalized width of a detected code element in accordance with the formula $$B_{norm}(n-1) = P_{norm}(n) - P_{(norm)}(n-1),$$

wherein $P_{norm}(n-1)$ represents the normalized position of the detected code element and $P_{norm}(n)$ represents the normalized position of the following code element.

25. A method in accordance with claim 17 wherein every region of a code element scanned along the scanning line forms a code element section, the method further comprising determined the normalized positions and widths of the code element sections, and finding a reference code element in each case from mutually associated code elements determined for different scanning lines and each representing the same code element of the bar code taking into account of the normalized positions and widths.

26. An apparatus for the reading of a bar code consisting of a predetermined number of code elements for the production of a binary signal with sequential high-low phases, the lengths of which correspond to the widths of the sequential code elements, the apparatus comprising a bar code reader that transmits at least one scanning beam for the scanning of code elements along scanning lines extending substantially parallel to one another, wherein a scanning beam that sweeps over the bar code defines a scan and each scanning beam on sweeping over the bar code defines a scanning plane, means for determining the angle of tilt between the respective scanning plane and a predetermined reference plane for substantially each scan, and grid error compensation means for the compensation of grid errors that take account of the angle of tilt that has been found.

27. An apparatus in accordance with claim 26 wherein a reading direction extends obliquely to the code elements.

28. An apparatus in accordance with claim 26 wherein the grid errors consist of non-uniform spacings between neighboring scanning lines during the decoding of the bar code.

29. An apparatus in accordance with claim 26 further comprising a sensor element for determining the spacings between different scanning lines.

30. An apparatus in accordance with claim 29 wherein the spacings are between neighboring scanning lines.

31. An apparatus in accordance with claim 29 wherein the sensor element is formed as a line sensor.

32. An apparatus in accordance with claim 31 wherein the line sensor is arranged perpendicular to the scanning direction.

33. An apparatus in accordance with claim 32 wherein the line sensor is arranged as one of a CCD line or a position sensitive detector.

34. An apparatus for reading a bar code comprising a predetermined number of code elements for the generating of a binary signal with sequential high-low phases, the lengths of which correspond to the widths of sequential code elements, the apparatus comprising a bar code reader transmitting at least one scanning beam along at least one scanning line, wherein a scanning beam sweeping over the bar code defines a scan, normalizing means for the normalizing of detected code elements with respect to their position within the scanning line and also their width in the scanning direction, and decoding means for decoding of the bar codes with respect to the normalized positions and widths of detected code elements.

35. An apparatus in accordance with claim 34 wherein a reading direction extends obliquely to the code elements.

36. An apparatus in accordance with claim 34 wherein the scanning beam is transmitted along scanning lines extending substantially parallel to one another.

37. An apparatus in accordance with claim 34 further comprising a beam divider through which the scanning beam can be additionally guided along a reference scanning line over a reference grid.

38. An apparatus in accordance with claim 37 wherein the beam divider consists of a semipermeable mirror.

* * * * *